H. W. MONTGOMERY.
SHAVING CUP.
APPLICATION FILED AUG. 30, 1909.
995,800.
Patented June 20, 1911.
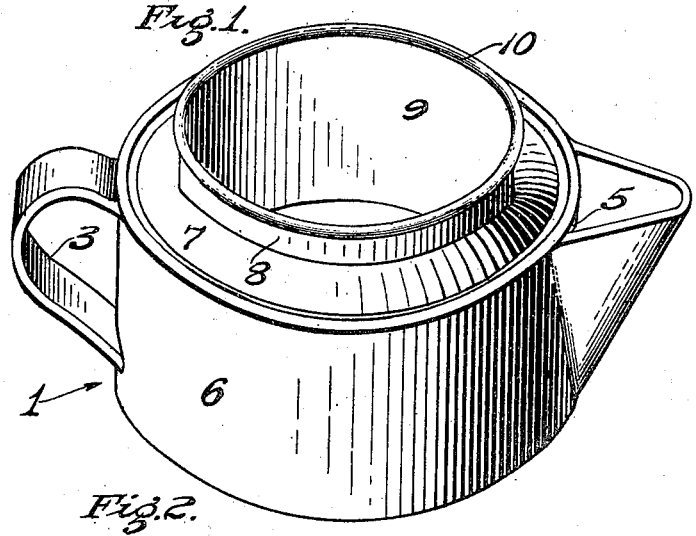
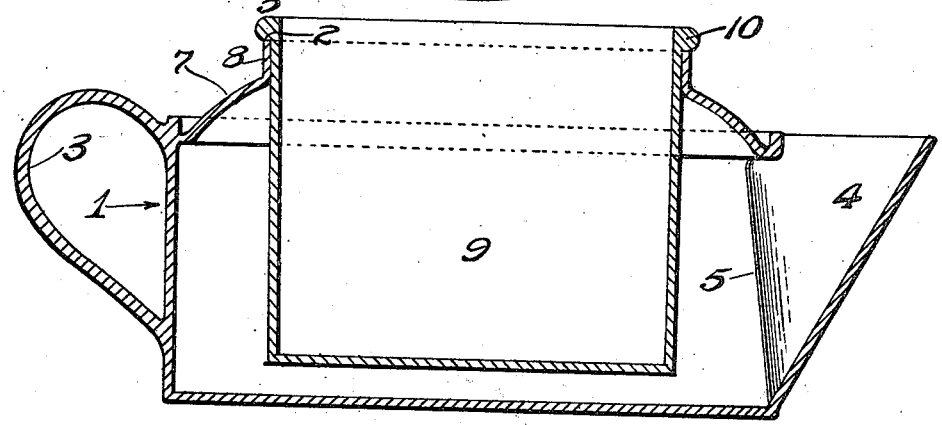
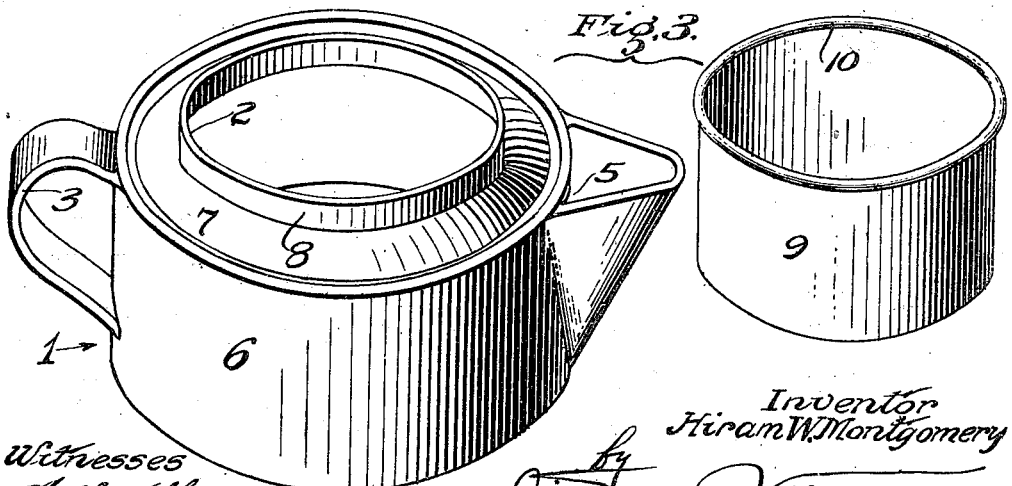
Inventor
Hiram W. Montgomery
by
James R. Townsend
his Atty.
Witnesses
W. N. Kirkby
M. Beulah Townsend.

UNITED STATES PATENT OFFICE.

HIRAM W. MONTGOMERY, OF SANTA MONICA, CALIFORNIA, ASSIGNOR OF ONE-THIRD TO ALBERT M. MONTGOMERY, OF SANTA MONICA, CALIFORNIA.

SHAVING-CUP.

995,800.      Specification of Letters Patent.     Patented June 20, 1911.

Application filed August 30, 1909. Serial No. 515,332.

*To all whom it may concern:*

Be it known that I, HIRAM W. MONTGOMERY, a citizen of the United States, residing at Santa Monica, in the county of Los Angeles and State of California, have invented new Improvements in Shaving-Cups, of which the following is a specification.

This invention relates to that class of shaving cup in which a shaving cup is seated in a vessel adapted to contain hot water.

The object of this invention is to construct a shaving cup of this character which will be more convenient for use and by means of which the shaving brush may be held without soaking the handle of the shaving brush in the hot water contained in the outer vessel.

The invention is capable of being carried out in various forms and may be constructed of various materials as porcelain, copper, silver, etc.

The accompanying drawings illustrate the invention in the form I at present deem most advisable.

Figure 1 is a perspective view embodying the invention. Fig. 2 is a vertical section of the same. Fig. 3 is a perspective view showing the two parts detached, and cleansing and antisepticizing.

The cup as shown comprises the body 1 of the water containing member having an open rim 2 and being provided on one side of the handle 3 and on the other side with a spout 4 having a wide opening 5 into the interior chamber of the cup, which chamber is formed with a low wall 6 from the inside of which is an annular hood 7 terminating in an upright collar 8 that forms the rim 2 and extends considerably above the top of the spout 4.

The soap cup 9 is provided at its upper end with an outwardly projecting bead 10 to rest on the rim 2 and to snugly fit in the collar 8. It is thus seen that the top of the soap cup is considerably elevated above the top of the spout and that the mouth of the spout is removed quite a distance away from the rim of the cup, thus giving ample room for the brush handle and when the shaving brush is inserted through the spout 4 the brush portion thereof will be supported by the lower end of the cup thus preventing the brush from slipping down so far inside the cup as to allow the handle to become soaked or covered with the water in the outer cup 1.

The collar 8 and the soap cup 9 are practically cylindrical and the bead 10 is arranged at such distance above the bottom of the soap cup that when said bead rests on the open rim 2 the bottoms of the soap cup and water cup will be slightly spaced apart to allow free circulation of the water underneath the soap cup so that the soap cup when in place will be kept hot by hot water contained in the outer cup.

I claim:—

A shaving cup comprising an outer vessel provided with a spout terminating on a level with the top of the walls of the vessel, said vessel also having an inwardly projecting annular hood provided with an open rim above the level of the spout; and a soap cup adapted to be inserted through said open rim into position above the inner opening of the spout, so that the shaving brush inserted through the spout may be mutually supported by the spout and the soap cup.

In testimony whereof, I have hereunto set my hand at Los Angeles, California, this 20th day of August 1909.

H. W. MONTGOMERY.

In presence of—
   JAMES R. TOWNSEND,
   L. BELLE RICE.

---

Copies of this patent may be obtained for five cents each, by addressing the "Commissioner of Patents, Washington, D. C."